Sept. 29, 1959 J. E. LYLE ET AL 2,906,352
REVERSIBLE DISK PLOW AND FURROW WHEEL UNIT
Filed Oct. 19, 1955 4 Sheets-Sheet 4
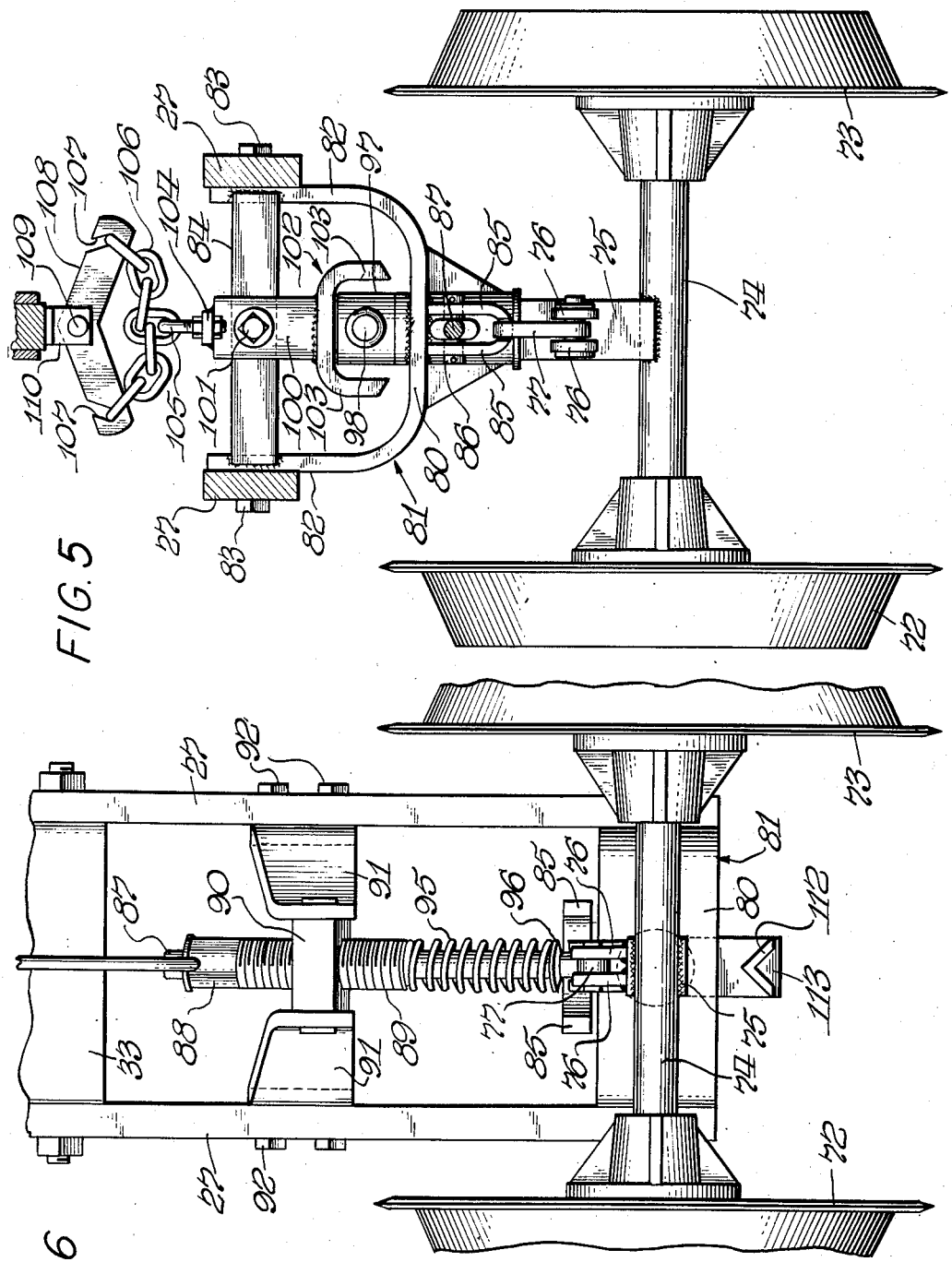
INVENTORS
JAMES E. LYLE
JORGE V. JARAMILLO
Paul O. Pippet
ATTORNEY United States Patent Office 2,906,352
Patented Sept. 29, 1959

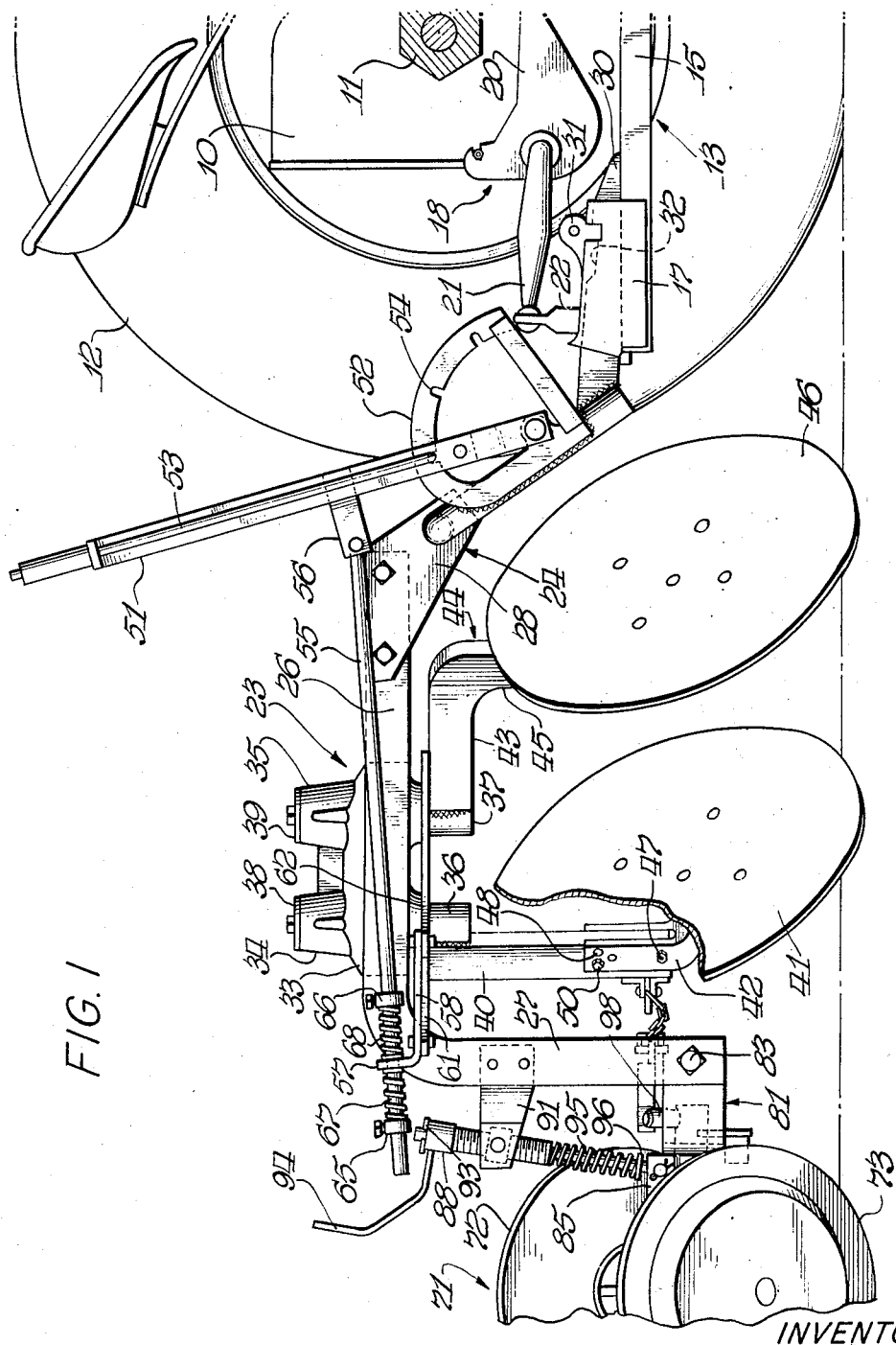

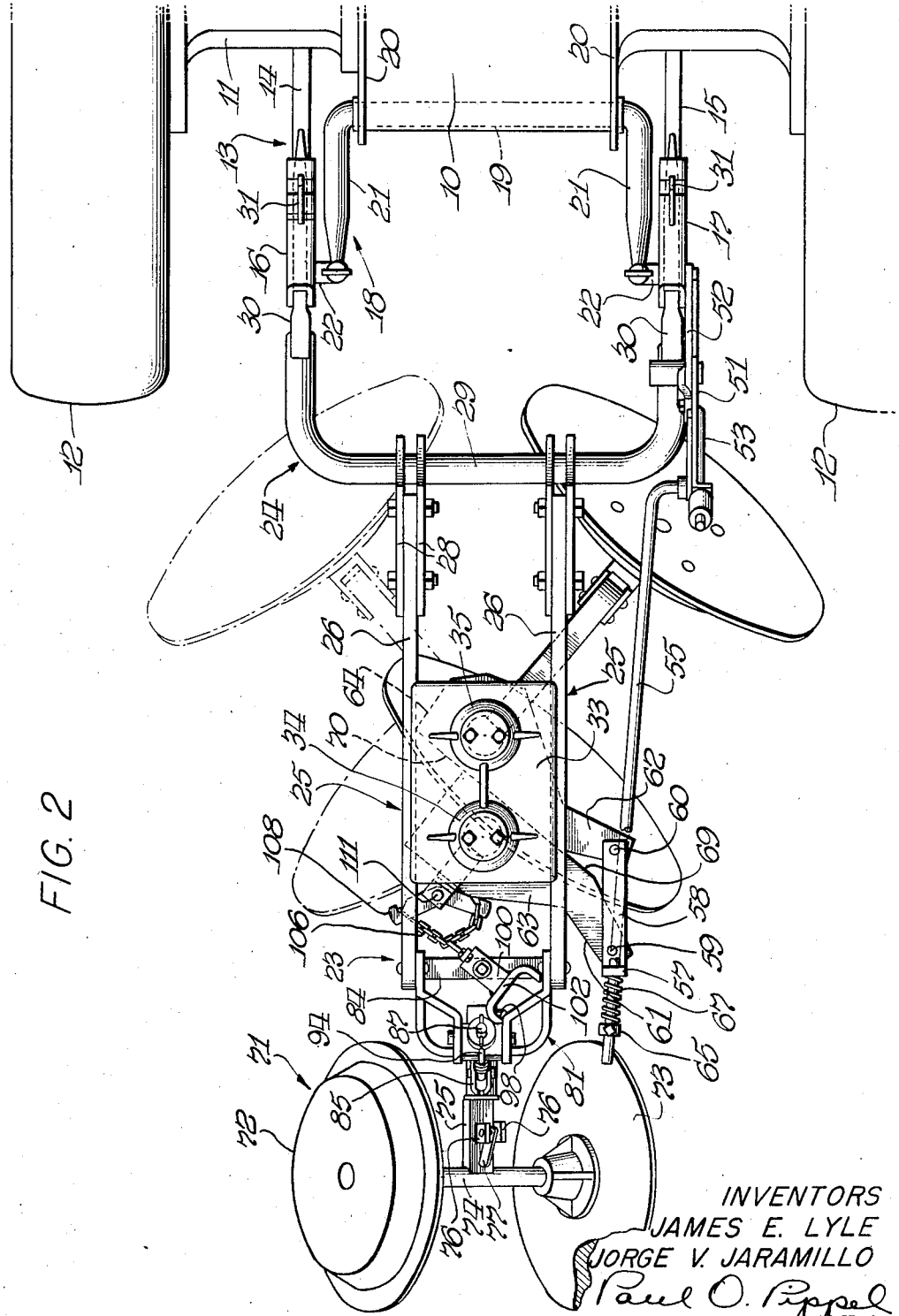

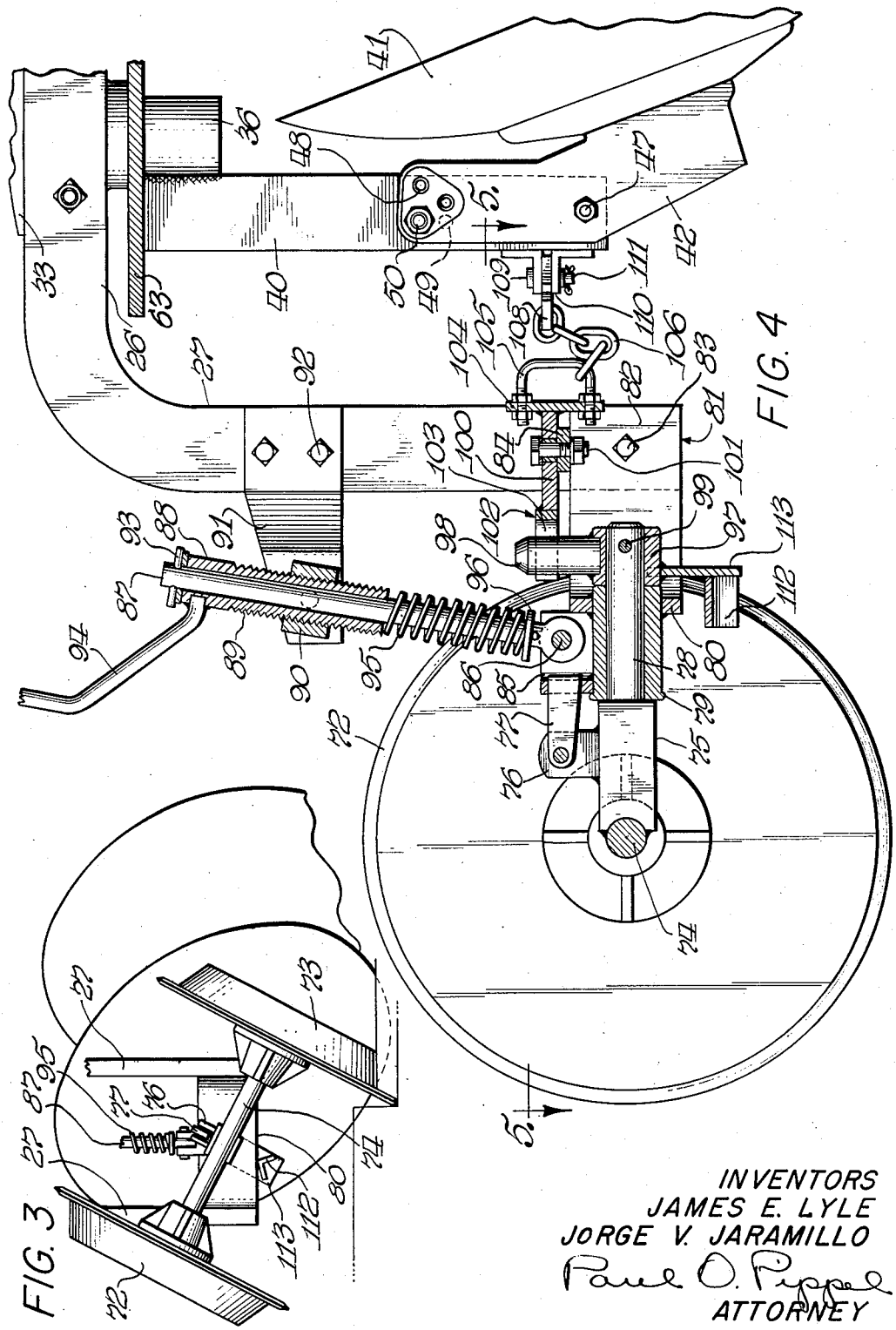

2,906,352
REVERSIBLE DISK PLOW AND FURROW WHEEL UNIT

James E. Lyle and Jorge V. Jaramillo, Saltillo, Coahuila, Mexico, assignors to International Harvester Company, a corporation of New Jersey Application October 19, 1955, Serial No. 541,456

4 Claims. (Cl. 172—212)

This invention relates to agricultural implements and particularly to plows. More specifically, the invention concerns a tractor mounted disk plow of the two-way or reversible type.

A disk plow of the type with which this invention is concerned comprises generally a main frame which is attached to the rear end of a tractor to be propelled thereby. In the present instance the main frame of the plow is provided with a hitch structure connected to attaching apparatus on the tractor, which not only facilitates the connection of the implement to the tractor, but is power lifted so that the entire implement may be raised to transport position on the tractor. The earth working tools are mounted on the supporting frame on a line diagonal to the direction of travel of the tractor and the rear end of the frame carries a furrow wheel unit which bears against the wall of the furrow made by the disks and offsets side thrust on the implement. In order that the plow may traverse the field in opposite directions, turning adjacent furrows, the gang of disks is made reversible and shifted on the supporting frame to the opposite diagonal with respect to the line of travel.

An object of the invention is the provision of an improved two-way or reversible disk plow or the like adapted for attachment to a tractor to be propelled thereby.

Another object of the invention is the provision of an improved reversible disk plow or the like comprising a gang of disks extending diagonally of the frame and the direction of travel, wherein improved means are provided for reversing the disk gang to the opposite diagonal, including novel means for limiting the swinging of the disk gang from one operating position to the other.

A further object of the invention is the provision, in an implement of the type referred to, of an improved furrow wheel unit comprising laterally spaced wheels connected by a transverse rigid axle member, and an operating connection between the disk gang and the furrow wheel unit for rocking the latter about a longitudinal axis to place one of the furrow wheels in operating position in the furrow while the other furrow wheel is elevated, reversal of the furrow wheel unit to replace the other wheel in operating position occurring in response to swinging of the disk gang unit from one alternate operating position to the other.

Another object of the invention is the provision in a double furrow wheel unit for a reversible disk plow or the like, of novel means for locking the furrow wheel unit in a neutral position with the furrow wheels side by side and the connecting axle member horizontal, when the plow is not in operation.

Other objects and advantages of the invention will become apparent from the following detailed description when read in conjunction with the accompanying drawings, wherein:

Figure 1 is a view in side elevation of the rear end of a tractor with one wheel removed, having mounted thereupon an implement in the form of a reversible disk plow embodying the features of this invention, and showing part of the furrow wheel unit and one of the disks broken away;

Figure 2 is a plan view of the structure shown in Figure 1 illustrating in full and dotted lines the alternate diagonal operating positions of the implement, parts of the tractor being removed for clarity;

Figure 3 is a fragmentary rear elevation showing the position of the furrow wheel unit when the disks are operating in right hand plowing position;

Figure 4 is an enlarged side elevation, partly in section, of the rear end of the plow frame, showing the operating connections between the rearmost disk standard and the furrow wheel unit for rocking the latter about its longitudinal axis in response to lateral swinging of the disk gang from one operating position to the other;

Figure 5 is a sectional view of the furrow wheel and its operating structure taken on line 5—5 of Figure 4 illustrating the position of the parts when the furrow wheel unit is locked in its neutral position; and Figure 6 is an end elevation of the structure shown in Figure 5.

Referring to the drawings, the numeral 10 designates the body of a tractor having a transverse rear axle structure 11 and transversely spaced rear drive wheels 12.

Implement attaching apparatus is provided on the tractor in the form of a draft structure generally indicated at 13 which is pivotally connected, in a manner not shown, in draft receiving relation to the tractor forwardly of the rear axle structure 11, and which includes laterally spaced rearwardly directed bars 14 and 15. Affixed to the ends of the bars 14 and 15 are elongated tubular socket members 16 and 17, respectively. Implement attaching structure 13 is raised and lowered with respect to the tractor by lifting means on the tractor, only a portion of which is shown, generally designated at 18, and including a transversely extending rockshaft 19, rocked by suitable means, not shown, deriving power from the tractor. Shaft 19 is rockably mounted in brackets 20 affixed to the tractor body and has its ends bent to form laterally spaced arms 21, each of which is pivotally connected at its end, to a lift link 22, one of which is connected to each of the socket members 16 and 17.

The implement of this invention includes a main supporting frame 23 having a forward hitch portion 24. Frame 23 comprises laterally spaced beams 25, each of which includes a longitudinally extending horizontal portion 26 and a downwardly bent rear end forming a vertical portion 27.

The forward ends of the beams 25 have affixed thereto laterally spaced plates 28 which are welded to the transverse bar portion 29 of the hitch 24. The ends of hitch bar 29 are bent forwardly and have secured to their ends shaft members 30, adapted for sliding reception in the socket members 16 and 17, respectively. Each of the sockets 16 and 17 is provided with latch means indicated at 31 adapted for cooperation with a suitable groove 32 provided in the shafts 29 to hold the parts against relative displacement. A unitary connection is thus provided between the implement and the tractor attaching means 13, so that upon actuation of the lift means on the tractor and rocking of the arms 21, the plow will be raised and lowered with respect to the tractor.

A flanged plate 33 extends between and is affixed to the beams 25. This plate serves as a brace between the beams and is provided with a pair of longitudinally aligned upstanding tubular members or bosses 34 and 35 which project above and below the plate 33 and provide bearings for the rotational reception of a pair of vertical spindles 36 and 37, respectively. Caps 38 and 39 are mounted on the upper ends of the spindles 36 and 37 to engage the upper ends of the bosses 34 and 35 and hold the spindles in place.

To the lower end of the rearmost spindle 36 is affixed, as by welding, a vertical standard 40, to the lower end of which a plow disk 41 is secured through the intermediary of a bracket 42. The disk 41 is mounted directly below the axis of the spindle 36, and swings in a small arc upon rocking or rotation of the spindle. The lower end of spindle 37 has welded thereto the horizontal portion 43 of a standard 44 having its outer end bent downwardly to form a vertical portion 45, upon the lower end of which is mounted the plow disk 46, in a manner similar to disk 41. It might be noted that the means by which the disks 41 and 46 are secured to their respective standards includes a pivot bolt 47 extending through bracket 42 and the associated standard. Adjustment in the angle of penetration of disks 41 and 46 is made by means clearly shown in Figure 4 for disk 41. It will be observed that the upper end of bracket 42 is provided with a plurality of triangularly arranged openings 48 adapted to be aligned with one of a pair of vertically spaced openings 49 in standard 40 to receive a bolt 50. By placing bolt 50 in another of the openings 48 and through one of the openings 49, the angle of the disk is altered.

The implement of this invention is a two-way plow and the gang of disks is adapted to be swung laterally about a vertical axis to alternately place the disks in position for right and left hand plowing. In Figure 2 the disk gang is shown in solid lines in position for right hand operation, and in dotted lines in position for left hand operation. Swinging of the disks from the solid line to the dotted line position of Figure 2 is accomplished by power transmission means including a conventional lever 51 pivotally mounted upon a quadrant 52 welded to the right hand forwardly bent end of the hitch 24, and having a detent 53 selectively receivable in one of several notches 54 provided in the quadrant.

A push rod 55 has its forward end pivotally connected to a lug 56 secured to lever 51, and its rear end is slidably receivable in an opening provided in the upwardly bent end 57 of a bar 58 which is pivotally connected at 59 and 60 to a pair of arms 61 and 62, extending laterally from a pair of plates 63 and 64 affixed to the spindles 36 and 37, respectively.

Collars 65 and 66 are adjustably mounted on the rod 55 on opposite sides of the member 57, and a pair of springs 67 and 68 are mounted on the rod between their respective collars 65 and 66 and the member 67, and are arranged to cushion shocks encountered by the disks 41 and 46 in operation. Swinging of the lever 51 about its pivot on the quadrant 52 acts through rod 55 and arms 61 and 62 to rock the plates 63 and 64, thus turning spindles 36 and 37 about their axes from one operating position to another. As will be observed in Figure 2, plates 63 and 64 are provided with opposing straight edges 69 and 70, respectively. It will also be noted that in the position of the disk gang as shown in solid lines in Figure 2, the adjacent edges 69 and 70 are in engagement over a considerable portion of their length, and this engagement of adjacent edges of the plates 63 and 64 functions as a stop to limit the extent of swinging of the disk gang from one operating position to another. While it should be understood that the adjacent edges 69 and 70 separate during swinging of the disk gang from the solid line to the dotted line position of Figure 2, they again engage when the limit of the latter position of the disks is reached.

The rear end of the implement is supported by a furrow wheel unit indicated at 71, and including a pair of laterally spaced furrow wheels 72 and 73, rotatably mounted upon a transversely extending axle 74 which, in the inoperative position of the implement, is disposed horizontally as indicated in Figures 5 and 6. A horizontal member 75 is affixed to and extends forwardly from the axle 74, and has welded thereto a pair of upstanding lugs 76, between which is pivotally mounted a latch arm 77, having a function to be hereinafter more fully described.

The forward end of member 75 is cylindrical and forms a spindle portion 78 rotatably received in a bearing 79 affixed to the transverse portion 80 of a U-shaped bracket 81 having forwardly extending arms 82. Arms 82 are pivotally connected to the lower ends of the vertical sections 27 of the plow beams, by means of the pivot bolts 83, and the ends of arms 82 are connected by a brace 84 welded thereto.

The furrow wheel unit 71 is adjustably held against vertical swinging about the pivot bolts 83 as an axis by means including a pair of upstanding elongated ears 85 affixed to the bearing portion 79 and supporting therebetween a pivot pin 86 upon which is mounted the lower end of a rod 87 which is slidably receivable in a sleeve member 88. Sleeve member 88 is provided with a threaded shank 89 adjustably received in a threaded swivel 90 pivotally mounted between a pair of brackets 91 secured by bolts 92 to the beam portions 27. Rod 87 is held against displacement relative to sleeve member 88 by the provision of a cotter key 93 engaging the upper end of sleeve 88. A handle 94 is provided and secured to the sleeve 88 for rotating the latter in swivel 90 to vary the tension on a spring 95, which surrounds bolt 87 between the lower end of sleeve 88 and a washer 96.

The furrow wheel unit 71 comprises dual furrow wheels 72 and 73, previously mentioned, only one of which is in operation at a time. In the positon of the parts shown in Figure 2, with the disk gang in position for right hand plowing, the right hand furrow wheel 73 is also in operating position and riding against the furrow wall made by the disks 41 and 46. The left hand furrow wheel 72 is elevated by the canting of the furrow wheel unit, and is in an inoperative position. When the plow gang is shifted to the dotted line position of Figure 2, the furrow wheel unit 71 must likewise be shifted so that the left hand furrow wheel 72 will be able to ride against the wall of the furrow made by the disk gang in the left hand plowing position. In order to accomplish this the furrow wheel unit 71 is bodily rocked as a unit about a horizontal axis extending longitudinally of the direction of travel and represented by the axis of the spindle portion 78 of member 75. In order that the proper furrow wheel 72 or 73 will be in operating position against the furrow wall automatically upon movement of the disk gang from one operating position to another, provision is made for rocking the furrow wheel unit about the longitudinal axis referred to in response to and as a result of the shifting of the gang of disks from one operating position to its alternate plowing position. For this purpose the forward end of spindle portion 78 of member 75 extends beyond the bearing 79 and has secured thereto a cap 97 to which is affixed a peg 98 extending upwardly therefrom. Cap 97 is secured to the end of spindle 78 by any suitable means such as a pin 99 for ready removal.

An actuating lever 100 is mounted by means of a pivot bolt 101 on the brace 84 centrally thereof. The rear end of lever 100 terminates in a yoke 102 having arms 103 spaced from opposite sides of peg 98. Upon lateral swinging of lever 100 about the axis of pivot bolt 101, one or the other of arms 103 engages the peg or post 98 to swing it laterally and rotate spindle 78, and therefore furrow wheel unit 71.

Lever 100 has affixed to its forward end a bar 104 to which is secured a U-bolt 105, which extends vertically, and has connected thereto the center link of a chain 106, which extends transversely of the implement and has its ends received in notches 107 in the ends of a triangularly shaped cross head 108, pivotally connected at 109 to a pair of lugs 110 by means of a pin 111. The lugs 110 are affixed to the rearmost standard 40. Thus, lateral swinging of the disk gang and therefore of the standard 40 acts through the chain 106 and actuating lever 100 to rock the furrow wheel unit 71 in a direction to place the appropriate furrow wheels 72 or 73 in operating position. For instance, in Figure 2 it will be observed that disk-carrying standards 40 and 44 have been swung in a direction to dispose the disks in position for right hand operation, and motion transmitted through the actuating lever 100 has caused the appropriate arm 103 of yoke 102 to engage peg 98 and swing the furrow opener unit in a direction to place the right hand furrow wheel 73 in operating position.

The extent of free rocking movement of the furrow wheel unit 71 is limited by the provision of stop means in the form of a triangularly shaped stop member 112 secured to a depending lug 113 affixed to the cap 97. As indicated in Figure 3, stop member 112 engages the transverse portion 80 of U-shaped member 81 in either direction of rocking of the furrow wheel unit.

When transporting the implement on the tractor, a neutral or normal position is provided for the rear furrow wheel unit and the disk gang is usually adjusted by operation of lever 51 to a position in longitudinal alignment with the direction of travel. The normal neutral position of the rear furrow wheel unit 71 is one in which the axle 74 is parallel with the ground. In this position, as viewed in Figures 5 and 6, arms 103 are spaced from peg 98 and the unit is capable of limited free rocking movement about the axis of shaft 78. In order to hold the furrow wheel unit in this position and prevent its bouncing around and swiveling during transport, latching means is provided in the form of a latch bar 77 which may be swung from the inoperative position of Figure 2 to the position of Figures 4, 5 and 6, wherein latch bar 77 has been swung about its pivot on the lug 76 to be received between the spaced inwardly curved rear ends of the ears 85.

The construction and operation of the two-way disk plow of this invention should be clearly understood from the foregoing description. However, it should likewise be understood that the invention has been described in its preferred embodiment and that modifications may be made therein without departing from the spirit of the invention or the scope of the appended claims.

What is claimed is:

1. In a disk plow or the like adapted for attachment to a tractor, a supporting frame extending rearwardly from the tractor including hitch means rigid with said supporting frame and attached to the tractor for vertical movement of the plow with respect thereto, a pair of longitudinally spaced vertically extending disk-carrying standards independently and rotatably mounted on said supporting frame, means on said standards for mounting the disks thereon at different distances from said standards and on parallel axes extending diagonally of said supporting frame to provide a gang of disks extending diagonally of the direction of travel of the tractor, lever arms affixed to said standards and extending radially therefrom, power means on the supporting frame, connecting means between said power means and said arms operative to rotate said disk-carrying standards between two operating positions on opposite diagonals of said direction of travel, longitudinal pivot means carried by said frame at the rear thereof, a furrow wheel unit mounted on said pivot means for free rocking movement about the axis of said pivot means, and an operating connection between one of said standards and said furrow wheel unit operable after a predetermined rotation of said standards to rock said furrow wheel unit to dispose said unit in operating position with respect to said disk gang in response to rotation of said standards, said furrow wheel unit comprising a pair of laterally spaced wheels rockable as a unit about said longitudinal axis to dispose one or the other of said wheels in operating position in response to rotation of said standards while the other wheel is elevated, and manually operable locking means optionally operable to hold said wheels in a neutral position with both wheels on the ground.

2. In a two-way disk plow, a supporting frame extending longitudinally of the direction of travel having means for the attachment thereof to a tractor to be raised and lowered thereby, a gang of disks rotatably mounted on the supporting frame diagonally thereof and of the direction of travel for swinging about a vertical axis to the opposite diagonal for alternately forming right and left hand furrows, longitudinal pivot means carried by said frame at the rear thereof, a furrow wheel unit at the rear of the frame comprising a transversely extending axle having a furrow wheel at each end mounted on said pivot means for free swinging about the axis of said pivot means from a horizontal neutral position to angled positions with one wheel in the furrow and the other elevated, means operatively connecting said gang of disks to said wheel unit operable after a predetermined movement of the disk gang for swinging the wheel unit in response to swinging of the disk gang, a relatively stationary member carried by the supporting frame and a pivoted latch carried by the pivot means releasably engageable with said relatively stationary member to lock said wheel unit in its neutral position.

3. In a two-way disk plow, a frame having means for the attachment thereof to a tractor, a gang of disks mounted on the frame diagonally thereof for swinging laterally to the opposite diagonal for alternately forming right and left hand furrows, a furrow wheel unit including a transverse axle having a furrow wheel at each end and a longitudinally extending spindle member affixed to said axle centrally thereof, means rotatably mounting said spindle member on said frame to accommodate limited swinging of the wheel unit about the axis of said spindle, a projection affixed to said spindle, a yoke pivotally mounted on the frame having arms alternately engageable with said projection to swing the wheel unit about the axis of the spindle, and connecting means between said gang and said yoke operative to actuate the latter to swing the wheel unit in response to lateral swinging of the gang of disks.

4. The invention set forth in claim 3, wherein the mounting of said wheel unit on the frame includes pivot means accommodating vertical swinging of the wheel unit relative to the frame and means are provided for yieldably resisting said vertical swinging.

References Cited in the file of this patent

UNITED STATES PATENTS

| 490,542 | Clark | Jan. 24, 1893 |
| 1,001,807 | Botts | Aug. 29, 1911 |
| 2,017,872 | Strandlund | Oct. 22, 1935 |
| 2,017,873 | Strandlund | Oct. 22, 1935 |
| 2,546,554 | McElroy | Mar. 27, 1951 |
| 2,675,749 | Pursche | Apr. 20, 1954 |
| 2,723,612 | Morkoski | Nov. 15, 1955 |
| 2,732,782 | Gurries | Jan. 31, 1956 |
| 2,764,075 | Fowler | Sept. 25, 1956 |

FOREIGN PATENTS

| 103,299 | Australia | Feb. 18, 1938 |
| 884,707 | Germany | July 30, 1953 |